(12) United States Patent
Mercat et al.

(10) Patent No.: US 8,708,424 B2
(45) Date of Patent: Apr. 29, 2014

(54) INTERFACE FITTING FOR A CYCLE WHEEL AND A CYCLE WHEEL COMPRISING A RIM, A TIRE, AND SUCH FITTING

(75) Inventors: Jean-Pierre Mercat, Chavanod (FR); Olivier Mouzin, Montmin (FR); François-Xavier Huat, Annecy (FR)

(73) Assignee: Mavic SAS, Metz-Tessy (FR)

( * ) Notice: Subject to any disclaimer, the term of this patent is extended or adjusted under 35 U.S.C. 154(b) by 306 days.

(21) Appl. No.: 12/840,793

(22) Filed: Jul. 21, 2010

(65) Prior Publication Data

US 2011/0018336 A1    Jan. 27, 2011

(30) Foreign Application Priority Data

Jul. 22, 2009    (FR) .................................... 09 03617

(51) Int. Cl.
    *B60B 7/01*    (2006.01)
(52) U.S. Cl.
    USPC ................................... 301/37.22; 301/95.106
(58) Field of Classification Search
    USPC ............... 301/95.101, 95.104, 95.106, 37.22, 301/37.24; 152/375, 379.3, 380, 381.3
    See application file for complete search history.

(56) References Cited

U.S. PATENT DOCUMENTS

| | | | |
|---|---|---|---|
| 1,743,074 A * | 1/1930 | Roth | 244/103 R |
| 2,573,996 A | 11/1951 | Spencer | |
| 2,874,745 A * | 2/1959 | Wann | 152/523 |
| 2,977,151 A * | 3/1961 | Ford, Jr. | 301/37.22 |
| 3,089,731 A * | 5/1963 | Barnes | 301/37.22 |
| 3,883,182 A * | 5/1975 | Barnes | 301/37.23 |
| 4,235,271 A * | 11/1980 | Olsen et al. | 152/186 |
| 4,319,618 A * | 3/1982 | Suzuki | 152/185 |

(Continued)

FOREIGN PATENT DOCUMENTS

| | | |
|---|---|---|
| EP | 7981 A1 * | 2/1980 |
| EP | 0 808 728 A2 | 11/1997 |

(Continued)

OTHER PUBLICATIONS

"Filling the tire-rim gap for better aerodynamics", BikeTechReview forum, Aug. 2007, 3 pages.*

(Continued)

*Primary Examiner* — Kip T Kotter
(74) *Attorney, Agent, or Firm* — Greenblum & Bernstein, P.L.C.

(57) ABSTRACT

A cycle wheel that includes a rim and a tire, having a width S, the rim including a rotational body whose cross section includes a main portion, having a width L greater than the width S, and a peripheral portion which is radially positioned outside of the main portion and which includes an annular cavity in which the tire is partially received. The outer surface of the wheel is comprised of the portions of the tire and of the rim facing outward of the wheel. The wheel further includes an interface fitting in contact with the rim and the tire, the interface fitting being positioned in a groove, one side wall of which is a portion of the outer surface of the tire and the other side wall of which is a portion of the outer surface of the rim. The interface fitting constitutes an intermediate portion of the outer surface of the wheel, the fitting being a deformable portion distinct from the tire and the rim, and at least 40% of the volume of the interface fitting being comprised of a hollow space.

24 Claims, 7 Drawing Sheets

(56) References Cited

U.S. PATENT DOCUMENTS

| | | | |
|---|---|---|---|
| 4,585,044 A * | 4/1986 | Carrera et al. | 152/165 |
| 5,061,013 A | 10/1991 | Hed et al. | |
| 5,632,528 A * | 5/1997 | Gohrbandt | 301/37.22 |
| 5,893,614 A | 4/1999 | Dennis | |
| 2006/0175891 A1* | 8/2006 | Diaz | 301/37.22 |
| 2006/0243856 A1* | 11/2006 | Chow et al. | 244/103 R |
| 2010/0171362 A1 | 7/2010 | Rathbone et al. | |
| 2010/0231028 A1* | 9/2010 | Brannon, III | 301/37.22 |

FOREIGN PATENT DOCUMENTS

| | | |
|---|---|---|
| FR | 2 555 106 A1 | 5/1985 |
| JP | 06270614 A * | 9/1994 |
| JP | 08216630 A * | 8/1996 |
| WO | WO 03106193 A1 * | 12/2003 |
| WO | WO-2008/142422 A1 | 11/2008 |

OTHER PUBLICATIONS

Rainer Pivit, "Bicycles and Aerodynamics" (translated from the original German language article by Damon Rinard), Radfahren magazine, Feb. 1990, pp. 40-44.*

U.S. Appl. No. 12/828,534 (Jean-Pierre Mercat et al.), filed Jul. 1, 2010.

* cited by examiner

Fig. 1 fig. 8 fig. 9

INTERFACE FITTING FOR A CYCLE WHEEL AND A CYCLE WHEEL COMPRISING A RIM, A TIRE, AND SUCH FITTING

CROSS-REFERENCE TO RELATED APPLICATION

This application claims priority under 35 U.S.C. §119 of French Patent Application No. 09 03617, filed on Jul. 22, 2009, the disclosure of which is hereby incorporated by reference thereto in its entirety.

BACKGROUND

1. Field of the Invention

The present invention relates to a cycle wheel comprising a rim and a tire.

2. Description of Background and Other Information

Cycle wheels are generally comprised of a rigid portion, i.e., the rim, on which an inflatable portion, i.e., the tire, is mounted. Two types of tires are commonly used for bicycle wheels; tubular tires and wire bead tires, the latter commonly referred to as pneumatic tires, sometimes as clincher tires, or, simply, as tires. The invention encompasses both of these tire types.

The amount of power a human being can generate is limited; therefore, the forward speed of a cyclist is limited. This speed results from a balance between the power developed by the cyclist and the forces opposing the advance, i.e., the forward motion. The opposing forces include, in particular, rolling resistance, which is independent of the speed and the aerodynamic resistance, and the drag, which is a function of speed squared.

The theory of aerodynamics teaches that at low Reynolds numbers, the more laminar the air flow around the moving object, the lower the drag. For this reason, configurations that generate separation of the air-flow are sought to be avoided, or, in any case, configurations are sought that limit air-flow separation as much as possible.

In the case of a cycle wheel, in particular a spoked wheel, because of its annular characteristic and because the direction of its advance through air is within its plane of symmetry, the shape of the tire as well as that of the rim determine the aerodynamic drag on the wheel. Indeed, depending upon the direction of advance of the wheel with respect to the front portion of the wheel, the tire constitutes the leading edge for penetration through the air, and the trailing edge is at the rim. Conversely, with respect to the rear portion of the wheel, the leading edge is at the rim and the trailing edge is at the tire.

Several manufacturers have proposed models of wheels which are claimed to reduce aerodynamic resistance. For example, the document U.S. Pat. No. 5,061,013 discloses a cycle wheel in which the ratio of the maximum width of the rim to the width of the tire is greater than 1. As another example, the document FR 2 555 106 discloses the positioning of a banding strip on a tire in order to center the tire on the rim and to reduce the aerodynamic penetration coefficient.

All such attempts have provided no satisfactory solution to the problem of reducing aerodynamic resistance. As will be seen hereinafter, the aerodynamic drag is often decreased for either the front or rear portion of the wheel, but not for both.

The rim disclosed in the document U.S. Pat. No. 5,061,013 does not comply with the standard of the ETRTO (European Tyre and Rim Technical Organization). In particular, this standard recommends that the recess of the rim not exceed 4.5 millimeters (mm) for a tubular rim. In the rim of this document, the rim recess is very substantial, which necessarily has consequences either on the mounting of the tire or on maintaining the tire on the rim. Indeed, if the outer diameter is that of a standardized rim, the tire can be mounted easily; however, due to the substantial size of the recess, the tire, once mounted on the rim band, will be loose. If the diameter of the rim band corresponds to the ETRTO recommendations, it will certainly be very difficult, during assembly, to pass the tire over the beads of the rim. In addition, the wheel obtained is not very comfortable insofar as, due to the substantial rim recess, the rim flange travel is reduced. A reduced rim flange travel multiplies the risks of puncture by crushing the tire and pinching the tube. To decrease this risk, the designer of the wheel disclosed in U.S. Pat. No. 5,061,013 chose to have thick and rounded upper rim edges. The thickness of the upper edges of the rim results in breaking the continuity of the outer surface of the wheel in the area of the tire/rim interface. This break of continuity is a source of disturbance in the air flow and therefore increases aerodynamic resistance. This is particularly the case for the rear portion of the wheel, i.e., whereby the leading edge is the rim and the tire is the trailing edge. Indeed, the width of the rim is much more substantial than that of the tire, which increases the frontal surface.

The document FR 2 555 106 proposes a banding strip to improve the connection of the edges of the rim to the tire. In this construction, the narrowing of the rim with respect to the tire has the consequence that, with respect to the front portion of the wheel, the air-flow separation limit is between the zone of the greatest width of the tire and the rim, causing a disturbance in the flow along the side walls of the rim. The separation of the air-flow generates a strong depression in the vicinity of the maximum width of the tire, which increases the aerodynamic drag. In the zone of the banding strip, the air-flow is already separated, so that this zone has no effect on the decrease in the drag. Indeed, the wheel disclosed in this document has almost the same aerodynamic drag, with or without a banding strip. In addition, as described in this document, the banding strip comprises edge beads to provide consistency with the elastic or plastic material that forms the connection profile. Such a construction is relatively heavy because, in the case of a tube, it involves providing the tube with a reinforcing element that is typical of wire bead tires, and in the case of a wire bead tire, it involves doubling this reinforcing structure. Consequently, even if there were improvement to the aerodynamics, such would be to the detriment of the weight of the wheel.

SUMMARY

The present invention provides a bicycle wheel having low aerodynamic resistance, regardless of the angle of incidence of the apparent wind with respect to the direction of advance of the bicycle, and in particular when the angle of incidence ranges between 0° and 35°.

The invention also provides a bicycle wheel having a reduced risk of punctures associated with rim flange travel; that is, the amplitude of radial deformation of the tire, to the point of the tire completely being crushed and the rim engaging the ground, is maximum.

The invention also provides a lightweight bicycle wheel.

The invention also provides a wheel for which the tire, whether a tubular tire or a wire bead tire, is easy to mount.

The invention also provides a bicycle wheel that complies with the ETRTO recommendations.

The invention also provides a wheel which, although using a common tire and/or rim, substantially reduces the aerodynamic drag.

To these ends, the invention is directed to cycle wheel comprising a rim and a tire, the rim being comprised of a rotational body, the cross section of which comprises a main portion and a peripheral portion that is radially positioned outside of the main portion, and which comprises an annular cavity in which the tire is partially received; the outer surface of the wheel being comprised of the portions of the tire and of the rim facing outward of the wheel; the wheel further comprising an interface fitting in contact with the rim and the tire, such interface fitting constituting an intermediate portion of the outer surface of the wheel and being a deformable element distinct from the tire and the rim.

According to advantageous but not mandatory characteristics of the invention, a wheel can incorporate one or more of the following technical features, taken in any technically acceptable combination:

- the width L of the main portion of the wheel is greater than the width S of the tire, when the tire is in an inflated state;
- the interface fitting is positioned in a groove, one side wall of which is a portion of the outer surface of the tire and the other side wall of which is a portion of the outer surface of the rim, and at least 40% of the volume of the interface fitting—50% in a particular embodiment—is constituted by a hollow space;
- the interface fitting extends substantially between an inner circle centered on an axis and having a diameter $D_1$, and an outer circle centered on an axis and having a diameter $D_2$, the diameter $D_2$ being greater than the outer diameter D of the wheel, decreased by four-thirds of the width S of the tire in an inflated state: $D_2 > D - (4/3) \times S$;
- the cross sectional profile of the outer surface of the interface fitting is a curved portion whose radius of curvature is always greater than the width of the tire in an inflated state;
- the height of the interface fitting is greater than 25% of the width of the tire in an inflated state;
- the interface fitting includes a ring and a hollow space arranged between the ring and the tire;
- the interface fitting includes two rings, each of the two rings being fixed on a respective one of the two sides of the wheel;
- along a planar section passing through the axis of the wheel, the hollow space has an area ranging between 5 $mm^2$ and 25 $mm^2$;
- the rings of the interface fitting are made of a material having a lower density than the density of the primary material of the rim;
- the rings of the interface fitting are made of a material whose density is lower than 1.2 $g/cm^3$, or lower than 1.1 $g/cm^3$ in a particular embodiment;
- the rings of the interface fitting are made of a foam-type material whose density is lower than 0.4 $g/cm^3$;
- the tire comprises beads, the rim comprises hooks adapted to retain the beads, and the fitting includes an edge that is pinched between the wire and the rim;
- the fitting includes a mating bead which is inserted between the tire and the rim, and against which the flange of the tire is supported; and
- the rings are adhesively affixed to the rim and/or to the tire.

The invention is also directed to a ring adapted to be mounted at the interface of a tire and a rim of a bicycle wheel, including an arrangement for fixing the ring to the rim, as well as a lip whose height is at least two times greater than its thickness.

In a particular embodiment of the invention, the ring is deformable so that the free end of the lip is pre-stressed to be supported against the tire.

In a particular embodiment of the invention, the arrangement for fixing the ring to the rim are constituted by the deformation of a portion of the ring, in order to "clip," or force-fit, the ring to the rim.

BRIEF DESCRIPTION OF THE DRAWINGS

Other characteristics and advantages of the invention will become apparent upon reading of the description that follows, with reference to the annexed drawings, which are given only by way of non-limiting examples, and in which.

DETAILED DESCRIPTION

Figure 1:
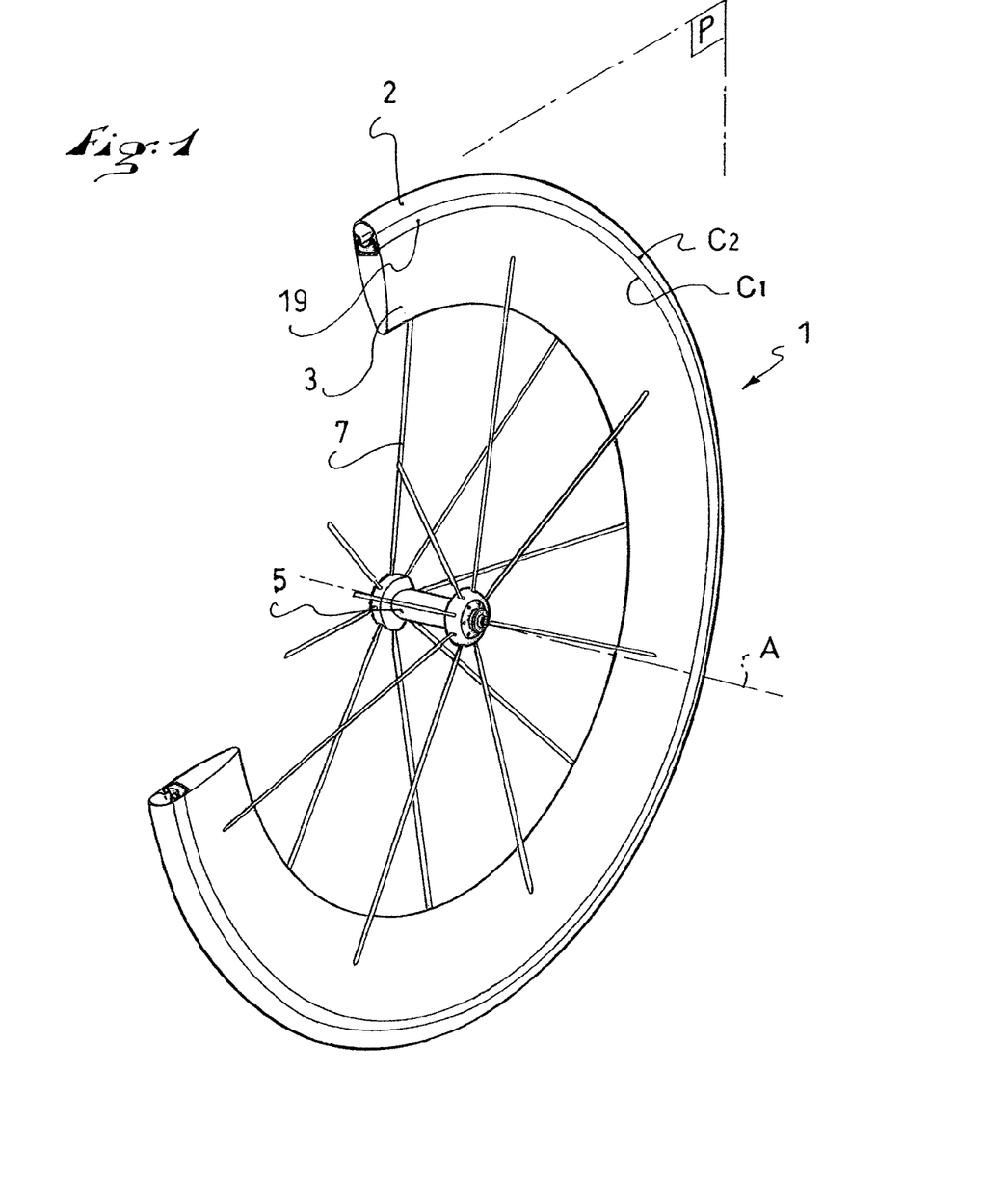
FIG. 1 is a perspective view of a wheel according to a first embodiment of the invention.

FIG. 1 provides a general view of a wheel 1 according to the invention. The wheel 1 includes a rim 3, a hub 5, and spokes 7 extending between and connecting the rim to the hub. The wheel 1 has a rotational axis A, about of which it rotates relative to the bicycle frame, and a plane of symmetry P, perpendicular to the axis A. The total diameter D of the wheel, i.e., the outer diameter of the tire when mounted on the rim and inflated to the recommended pressure, ranges substantially between 600 mm and 680 mm. By outer surface of the wheel is meant all of the portions of all of the components of the wheel facing outward of the wheel, and which, consequently, are in contact with the air flow during use of the wheel.

Although a spoked wheel is shown in FIG. 1, it is to be understood that the invention is not limited to a wheel of this type. Moreover, neither the types of spokes used, nor their attachment to the rim and hub are discussed in detail herein.

Figures 2, 3:
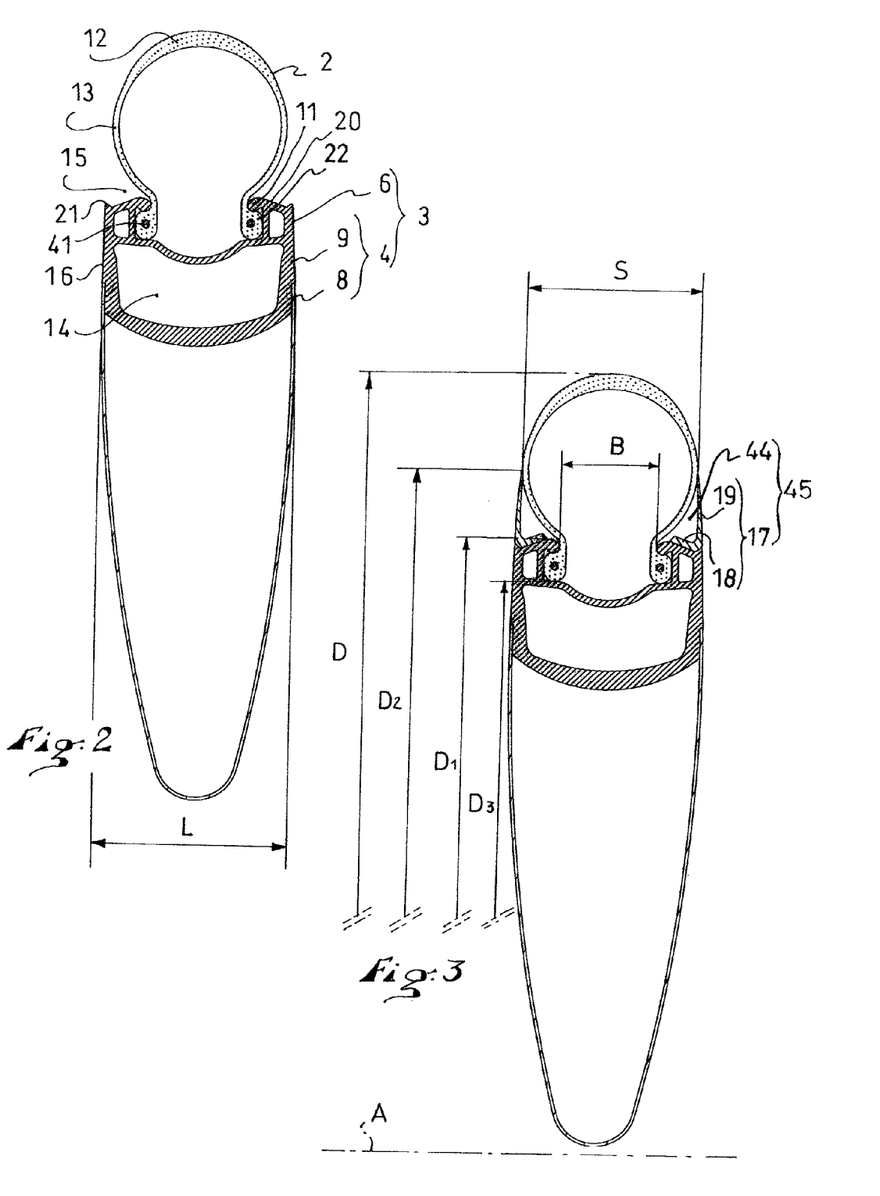
FIG. 2 is a partial cross section of the wheel of FIG. 1 during assembly.
FIG. 3 is a view similar to FIG. 2, with the interface fitting in place.

FIG. 2 shows the partial profile of the wheel, i.e., a partial cross section of the wheel, during assembly according to a first embodiment of the invention. This is a wheel having a total diameter D ranging between 600 mm and 680 mm. The rim 3 is made by extrusion of a metallic profile element, for example an aluminum alloy, which is cut and bent to provide it with an annular shape. The rim 3 comprises a main portion 4 and a secondary portion 6, or peripheral portion, adapted to receive the tire 2. The main portion 4 of the rim is comprised of the lower portion of an aluminum profile element 9 and a sidewall extension part 8 made of composite material and affixed to, or extending from, the lower side portions of the profile element 9. The manufacture of the rim, as described here, is only one choice among a number of other possibilities, and the invention encompasses implementations of the invention with rims made entirely of composite, metal, or plastic material, or any combination of these and other materials.

The wheel includes a tire 2, the beads 22 of which are retained between the hooks 11, or lips, of the rim 3. The beads 22 of the tire each include a stiffening wire 41. The tire includes a tread 12, structured and arranged to come in contact with the ground (such as a road or a track). The tread 12 and the beads 22 are separated by sides 13. In cross section, from bead to bead, the external shape of the tire is substantially circular. When in an inflated state, the tire has a width S that is equal to 23 mm±0.5.

The profile element 9 includes a hollow casing 14 overlaid by the U-shaped structure constituted by the peripheral portion 6 of the rim 3. The U-shaped structure is closed by two at least generally axially inwardly projecting hooks 11, or lips, whose function is to retain the beads 22 of the tire 2. In this particular embodiment, the spacing B between the two hooks is equal to 12.7 mm. In accordance with the recommendations of the ETRTO standard, the rim 13C can receive tires having a width S ranging between 18 mm and 25 mm.

The sidewalls 16 of the rim are two truncated surfaces positioned on each side of the rim and which, with the plane of symmetry P of the wheel, form a relatively small angle, for example 2°. When the wheel is mounted on a bicycle and is in the braking phase, these sidewalls of the rim are in contact with the brake pads. This is a non-limiting feature of the invention; indeed, these lateral surfaces can be made to be coplanar with the plane of symmetry, or with a progressive curvature; or the invention can be implemented with wheels having disc brakes, not requiring a particular configuration for the sidewalls of the rim.

The maximum width L of the rim is substantially at the top of the main portion 4 of the rim, in the vicinity of the peripheral portion 6. The width L is slightly greater than the width S of the tire.

FIG. 2 shows a cross section of a wheel during assembly. The interface zone between the outer surfaces of the rim 3 and of the tire 2 defines an annular groove 15 on each side of the wheel. The groove 15 is defined by its two sidewalls. The first of these sidewalls is a portion of the outer surface of the tire, whereas the second of the sidewalls is a portion of the outer surface of the rim. As shown, in this state, the outer surface of the wheel includes, on each side, in the area of the rim/tire interface zone, a deep notch which would have a detrimental effect by increasing the aerodynamic drag of the wheel.

FIG. 3 shows how, according to the invention, the positioning of an interface fitting considerably modifies the outer surface of the wheel. The interface fitting is directed to the filling of the groove 15. It includes an intermediate element between the rim and the tire, which is distinct from them, i.e., interface fitting is a component of the wheel distinct from the rim and the tire. Because the wheel is symmetrical with respect to its primary plane, the interface fitting includes a pair of circular rings 17, each filling up one of the grooves 15, the cross section of each ring 17 substantially having the profile of a "V". The interface fitting also includes closed hollow or empty spaces which, over most of its height, separate the ring 17 from the outer surface of the tire.

Each of the rings 17 includes a base 18 and a lip 19. The lip 19 is comprised of a substantially planar annular portion, or to be more precise, substantially truncated with an apex angle close to 180°, substantially oriented along the plane of symmetry P. The inner diameter of the lip 19 is equal to 633 mm in this particular embodiment, corresponding more or less to the outer diameter $D_1$ of the rim 3, which is equal to 631 mm. Its outer diameter $D_2$, at the upper end 24 of the lip 19, is greater than 636 mm; and in the embodiment shown, it is equal to 650 mm.

When positioned on the wheel (see FIG. 1), the ring 17 constitutes an intermediate portion of the outer surface of the wheel, which extends between two circles having an axis A. The inner circle C1 has a diameter substantially equal to the outer diameter of the rim, whereas the outer circle C2 has a diameter equal to $D_2$. See FIG. 1. The circumference of the upper end 24 of the lip 19 is greater than that of the base 18 of the ring 17 by a value between 4% and 7% or, in a more specific range of embodiments, between 5% and 6%.

The base 18 of the ring 17 rests on the profile element 9 of the rim, in the area of the hooks 11, on a truncated surface 20. It is retained on this surface by a spoiler 21, or upturned lip of the rim, i.e., a lip projecting radially outward. The lip 19 of the ring 17 projects from the base 18, at the outer zone thereof, and extends until contacting the tire 2. In cross section, the outer profile of the lip 19 is a curved portion whose radius of curvature is always greater than the value of the width S of the tire.

The ring 17 is made of a plastic material, for example thermoplastic elastomer (TPE) or polyether block amide (PEBA). Materials that can be used to make the ring 17 include, in a non-limiting way, Pebax®, Hytrel®, Keflex®, rubber, silicone. The material selected and the shape of the ring promote its elastic deformation. The deformable characteristic of the ring is used for positioning the ring by clipping it into the groove 15, on the one hand, and in order not to hinder the deformation of the tire during use of the wheel, on the other hand. A very strong compression of the tire, in which the portion of the tire subject to impact is crushed and flattened completely, could generate a substantial deformation of the ring 17, for example the V-shaped opening, without irreversible damage to the ring.

Figure 4:
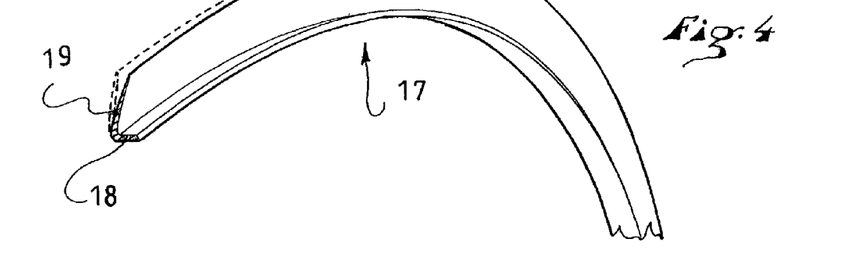
FIG. 4 is a perspective view of the interface fitting.

The angle formed by the spoiler 21 and the surface 20 of the rim enables the ring 17 to be pre-stressed axially, so that the upper end 24 of the lip 19 is pressed against the tire. This angle is slightly smaller than the angle which the base 18 and the lip 19 form therebetween prior to the positioning of the ring on the wheel. FIG. 4, which shows the ring 17 before it is positioned between the rim and the tire, illustrates this difference by showing the position of the lip in broken line, once the ring is in position. In addition, as shown in the enlarged portion of FIG. 5, there is a clearance 32 between the truncated surface 20 and the free edge of the base 18. The pressing of the upper end 24 of the lip 19 against the tire results partly from the pivoting effect of the ring around the junction zone between the base 18 and the lip 19.

The ring 17 is also pre-stressed radially in tension, insofar as its diameter before assembly is smaller than its diameter after being positioned on the rim. A pre-stressing corresponding to a variation of the diameter greater than 1% or, more particularly, within a particular range between 1% and 5%, yields good results.

The lip 19 constitutes a flexible annular portion, or flange, of the ring 17, whose outer end, i.e., the upper end 24, extending in a substantially radial direction, is capable of moving along a direction substantially oriented along the axis A. The flexional deformation is made possible in particular by the fact that the height h of the lip is greater than its thickness e; in particular greater than two times the thickness e, or, in another embodiment, greater than three times the thickness e.

For reasons of lightness of the wheel, and depending upon the inherent characteristics of the material selected to make the ring 17, a thickness e capable of reaching the height h, divided by 5, is a particularly advantageous embodiment. In this example, the lip 19, whose height h is measured from the location at which the lip separates from the base 18 up to the upper end 24, is greater than 15% of the value S, or in a particular advantageous embodiment, greater than 25%. In this example, the height h measures approximately 10 mm and the thickness e, measured equidistant from the upper end and the base, is equal to 0.5 mm.

For the purpose of reducing the weight of the complete wheel, a material used for the ring can be selected, within the scope of the invention, which has a density less than 1.2 g/cm$^3$ or, in a particular embodiment, less than 1.1 g/cm$^3$. In this way, the ring has a much lower density than that of the rim, whether the rim is made of aluminum (density 2.7 g/cm$^3$) or carbon (density 1.6 g/cm$^3$), but also less than that of the tire, which can reach 1.4 g/cm$^3$.

In addition, the area of the cross section of the ring 17 is small in comparison with the area of the cross section of the groove 15 (i.e., the space between the outer surfaces of the rim 3 and of the tire 2, as mentioned above). In fact, the empty or hollow space 44 demarcated by the base 18, the lip 19, and the lower portion of the side of the tire is relatively consequential. In the example shown, the area of the cross section of the ring 17 is equal to approximately 11 mm$^2$, whereas the area of the cross section of the hollow space 44 is equal to approximately 15 mm$^2$. If the volume of the groove 15 were defined as being the volume adapted to be filled by the interface fitting, there is, in this example, a ring 17 that fills up 42% of the volume of the groove 15, the hollow space 44 representing 58% of the filled volume.

The term hollow space, rather than empty space, is preferred to define the closed space defined by the ring 17, the rim 3 and the tire 2, because although it is empty of the constituent material the ring, it is filled with air.

The hollow space 44 makes it possible to reduce the weight of the interface fitting and, therefore, of the entire wheel. Depending upon the shape of the ring 17, the depth of the groove 15 and the density of the material selected for the manufacture of the ring, a hollow space 44 of sufficient size is advantageous, according to the invention, because the effects of the hollow space are thereby notable. In particular, the profile of the cross section of the ring 17 is dimensioned such that the area of the cross section of the hollow space 44 ranges between 5 mm$^2$ and 25 mm$^2$. These values are given in particular for wheels having a diameter of 622 mm. More generally, the ring 17 is dimensioned so that the hollow space 44 corresponds to at least 40%, or, in a particular embodiment, to at least 50% of the volume of the groove 15 filled by the interface fitting.

The hollow space 44, over a large portion of its height, makes it possible to separate the lip 19 from the outer surface of the tire, only the upper end being in contact. Thus, the ring 17 does not oppose any resistance to the deformation of the tire.

In the example described, the material selected for the ring is a thermoplastic elastomer marketed under the mark PEBAX 40-33 having a density of 1.1 g/cm$^3$. This produces a ring whose weight is approximately 21 g. It is therefore understood that the two rings 17 only slightly increase the total weight of the wheel. In general, this increase ranges between 10 g and 100 g. Compared to the weight of a pneumatic tire/tube assembly, and to the weight of a rim, the weight of a pair of rings 17 represents between 5% and 20% of the first, and 5% and 30% of the second.

In the example described, the rings and hollow spaces are axisymmetric, i.e., they are rotational bodies. Within the scope of the invention, the rings 17 can include positioning ribs which join the lip 19 and the base 18 and which, thereby, divide the hollow space 44 into a plurality of smaller hollow spaces.

In an alternative of the first embodiment of the invention, the ring can be made out of two or more materials, one material for the base and another for the lip.

In another alternative, the base 18 can be equipped with a wire or a reinforcement to guarantee that it is retained more efficiently on the rim.

The lip 19 constitutes a portion of the outer surface of the wheel that provides the interface between the rim 3 and the tire 2, which contributes to reducing its aerodynamic resistance.

The diameter $D_2$, which corresponds to the maximum radial extension of the lip 19 on the tire, is relatively substantial, so that the lip rests on the side of the tire, in the vicinity of the zone of the greatest width of the tire. In practice, $D_2$ is greater than the outer diameter D of the wheel, decreased by four-thirds of the width S of the tire in an inflated state: $D_2 > D - (4/3) \times S$.

If the wheel is adapted for braking on the rim, the inner diameter $D_1$ of the interface fitting is greater than the inner diameter $D_3$ of the tire, which is constituted by the resting diameter of the beads of the tire on the rim. Thus, the extension of the ring towards the center of the wheel is limited, and the ring does not extend into the braking zone.

If the wheel is adapted for disc braking, the extension of the ring towards the center of the wheel can be provided to be more substantial.

The wheel described in the first embodiment is equipped with a 622 rim, that is, the ETRTO diameter of the surface receiving the beads of the tire is 622 mm. Depending upon the dimensions of the tire mounted on the rim, which can have a width ranging between 18 mm and 25 mm, for example, the outer diameter D of the wheel ranges between 660 mm and 680 mm. The diameter $D_2$, corresponding to the outer diameter of the ring is then greater than 630 mm. Of course, these values are given by way of example. Other values are given in Table 1, in particular for the 571-mm rims.

TABLE 1

| Rim (mm) | 622 | | | 571 | | |
|---|---|---|---|---|---|---|
| Tire - S (mm) | 18 < S < 25 | | | 18 < S < 25 | | |
| Wheel - D (mm) | 660 < D < 680 | | | 600 < D < 620 | | |
| | S = 18 | — | S = 25 | S = 18 | — | S = 25 |
| Ring - $D_2$ (mm) | $D_2 > 636$ | — | $D_2 > 648$ | $D_2 > 576$ | — | $D_2 > 588$ |
| Ring - h (mm) | h > 4 | — | h > 6 | h > 4 | — | h > 6 |

Figures 5, 5A:
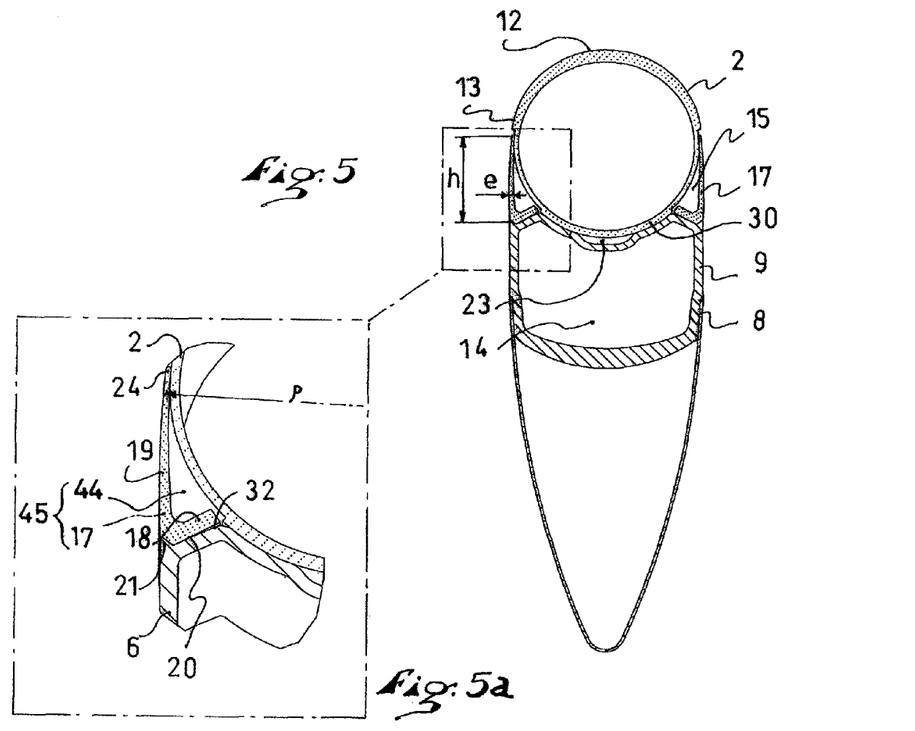
FIG. 5 is a cross section of a wheel according to an alternative of the first embodiment of the invention.
FIG. 5a is a view of an enlarged detail of FIG. 5.

FIG. 5 shows the partial cross section of a wheel according to an alternative of the first embodiment of the invention. In this alternative, the wheel is equipped with a tire of the tubular type. The tire is fixed to the peripheral portion of the rim by means of glue, or adhesive. The tire portion that is adhered to the rim is referred to as the base 30 of the tire. The tire includes a tread 12, structured and arranged to come in contact with the ground (such as a road or a track). The tread 12 and the base 30 are separated by sides 13. In cross section, the external shape of the tire is substantially circular. When in an inflated state, the tire has a width S that is equal to 23 mm±0.5. Tires having different dimensions could be used, in particular tires whose width ranges between 18 mm and 25 mm.

The rim 3 comprises a main portion, comprising sub-portions 8, 9, and a peripheral portion 6, the latter adapted to receive the tire 2. More particularly, the main portion of the rim is comprised of the lower portion of the aluminum profile element 9 and of a sidewall extension part 8 made of composite material and affixed to, or extending from, the lower portion of the side walls of the profile element 9. The profile element 9 includes a hollow casing 14, on the outer surface of which the annular cavity 23, in which the tube is partially received, is arranged.

The annular cavity 23 is bordered on each side with truncated surfaces 20, on which the rings 17 rest. The rings 17 are similar to those shown in FIGS. 1 to 4.

After the tube is adhered to the rim, the rings 17 are positioned at the interface between the rim and the tube. As shown in closer detail in FIG. 5a, the base 18 is positioned against the truncated surface 20 and is retained in position by the spoiler 21. The ring is pre-stressed to ensure that the upper end 24 of the lip becomes pressed properly against the side 13 of the tire.

The outer diameter of the rim is that of one of the values recommended by the ETRTO standard. In this example, this diameter is equal to 633 mm. The tube adhered to the rim has a width ranging between 17 mm and 26 mm, and substantially equal to 23 mm, in this example. The diameter D of the wheel is substantially equal to 680 mm and the outer diameter $D_2$ of the ring (diameter of the upper end of the lip) is greater than 648 mm.

In particular for a wheel structured and arranged for braking on the rim, the inner diameter $D_1$ of the ring is greater than the inner diameter $D_3$ of the tube.

To ensure a better stability of the rings 17 in the grooves 15, a rolling of the upper portion of the lip 19 can be undertaken prior to their assembly on the wheel. The rolling is carried out by passing the upper portion of the lip 19 between two rollers and results in a lengthening of 5% to 6% of the upper end of the lip. If a ring not modified by rolling were to be mounted on the wheel with a certain pre-stressing, such pre-stressing, already present in the lower portion of the lip 19 and the bases 18, would be increased in the upper portion of the lip as one approaches the upper end 24 of the lip, due to the increase in the radius of curvature. Due to the lengthening of the upper portion of the lip 19 in a modified ring, once mounted, the pre-stressing in tension to which is the upper end 24 of the lip is subject, is practically null.

Figures 6, 6A:
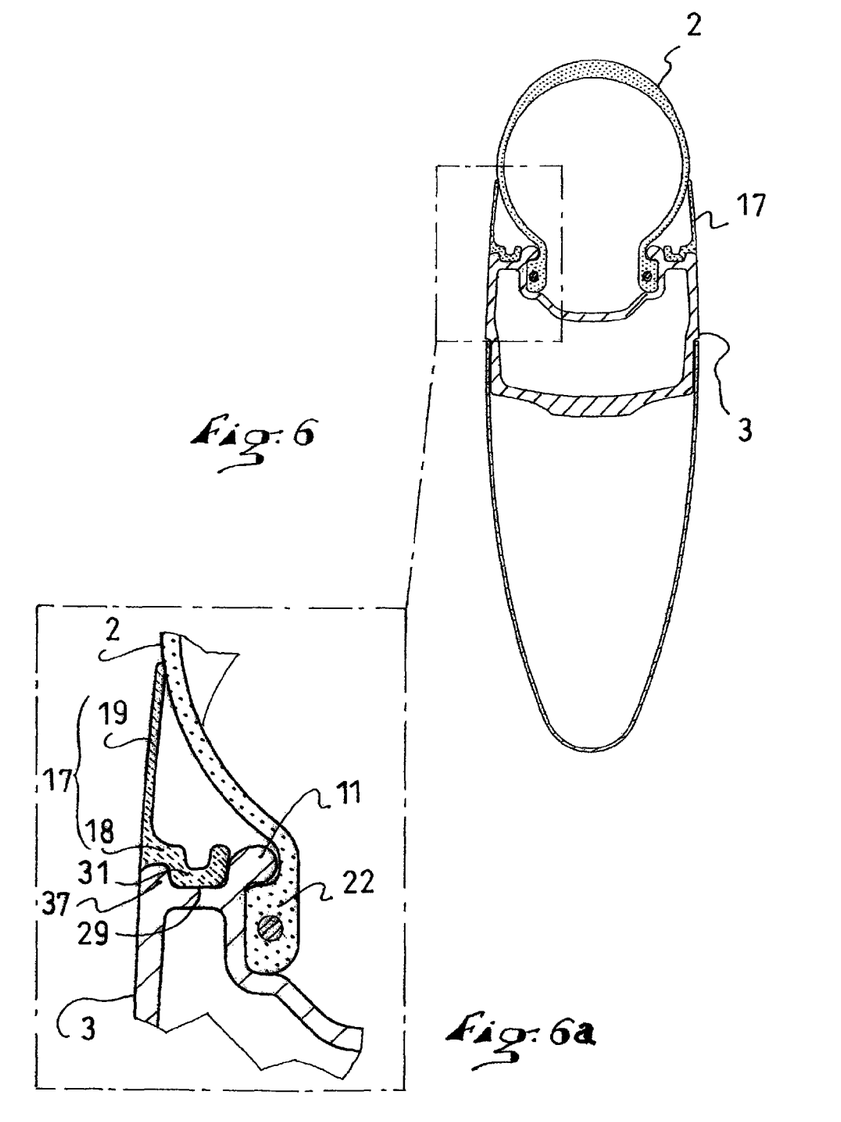
FIG. 6 is a cross section of a wheel according to a second embodiment of the invention.
FIG. 6a is a view of an enlarged detail of FIG. 6.
Figures 7, 7A:
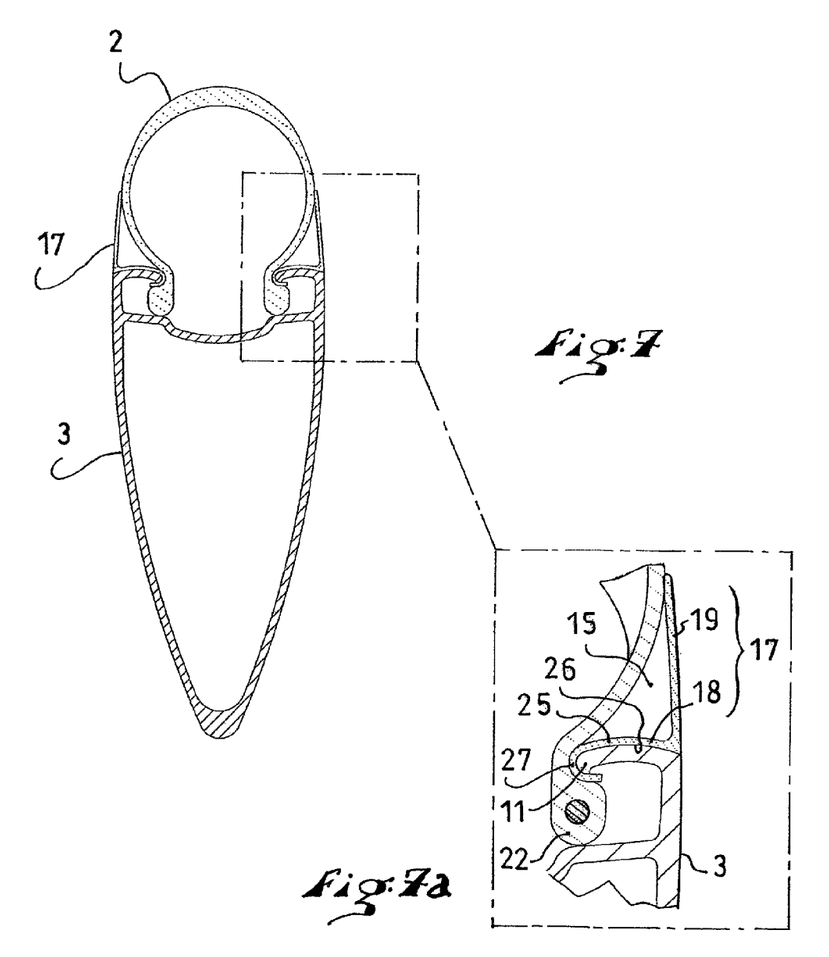
FIG. 7 is a cross section of a wheel according to a third embodiment of the invention.
FIG. 7a is a view of an enlarged detail of FIG. 7.
Figure 8:
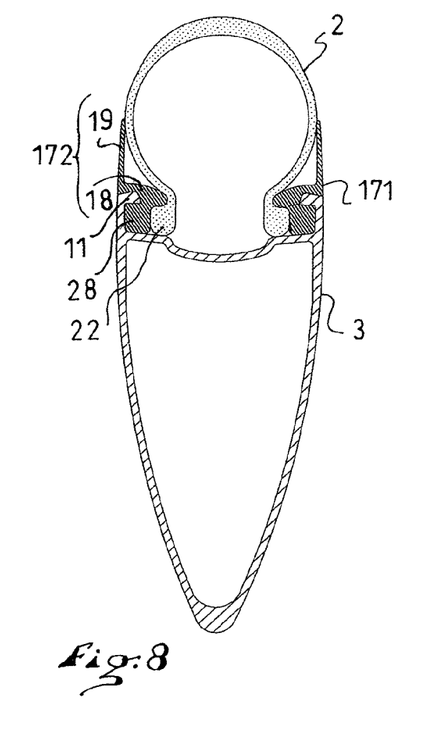
FIG. 8 is a cross section of a wheel according to a fourth embodiment of the invention.

In the second, third, fourth, fifth, and sixth embodiments of the invention, shown in respective ones of FIGS. 6, 7, and 8, the elements similar to those of the first embodiment bearing the same reference numerals. The following description primarily discloses that which distinguishes these embodiments from the preceding embodiments. Unless indicated otherwise, the components of the bicycle wheel of the embodiments are identical to and function as those of the first embodiment.

FIG. 6 shows a second embodiment of the invention, which is different from the first embodiment in that the ring 17 is maintained on a region of the rim 3 by "clipping," i.e., a type of friction-fit or snap-fit.

As shown in closer detail in FIG. 6a, the peripheral portion of the rim, which receives the base 18 of the ring 17, includes a recessed zone 29, between the bead 37 of the rim and the hook 11. The base 18 is designed with a projecting portion 31 having a complementary shape with respect to the recessed zone 29, and which becomes nested therein.

The projecting portion 31 is slightly larger than the recessed zone 29 which receives it. However, because of its deformable characteristic, the ring 17 is fixed on the rim when the projecting portion 31 becomes elastically deformed in order to be retained in the recessed zone 29.

The "clipping" of the ring 17 on the wheel can be reversed, i.e., so that the ring can be removed, with an appropriate tool or tools, for example before dismounting the tire.

In FIG. 7, as in the first embodiment, the tire 2 is retained on the rim 3 by blocking the beads 22 of the tire under the hooks 11 of the rim.

As shown in closer detail in FIG. 7a, each of the hooks 11 is positioned at the end of a region 26 extending from the top of the side walls of the rim. The regions 26 are approximately cylindrical portions centered about the axis A. Of course, the corresponding regions shown in FIG. 6 are not cylindrical surfaces. However, they are rotational surfaces that can be considered as substantially cylindrical with an axis A, insofar as they are oriented about the axis A.

A ring 17 is positioned on each side in order to close and fill the groove 15 constituted by an interface zone between the tire and the rim. The ring 17 includes a base 18 ensuring the positioning of the ring on the periphery of the rim 3, as well as a lip 19 which constitutes a portion of the outer surface of the wheel.

The base 18 of the ring 17 includes an approximately cylindrical portion 25 having an axis A, which is pressed against the region 26 of the rim 3, as well as a curved, or bent, edge 27. The curved edge 27 surrounds the hook 11 until passing beneath it. The edge 27 has the function of retaining the ring 17 by pinching between the rim and the tire.

Everything described hereinabove with respect to the ring of the first embodiment, including dimensions, diameter, thickness, pre-stressed assembly, etc., is also applicable to the ring 17 shown in FIG. 7.

FIG. 8 discloses a fourth embodiment of the invention, which is similar to the preceding embodiment in that the ring 17 providing the interface between the tire 2 and the rim 3 is retained by wedging between the bead 22 of the tire and the hook 11. However, although, in the third embodiment, the ring is mounted optionally on an unmodified standardized rim, that is, which is also capable of receiving the tire alone, without the ring, the ring is required, in the fourth embodiment, in order to mount the tire properly.

The ring 17 of FIG. 8 no longer includes a curved edge, but a mating bead 28 located beneath the base 18, which serves as a spacer between the hook 11 and the tire.

For the third and fourth embodiments of the invention, the assembly of the wheel requires undertaking certain operations in a predefined order, which is described hereinafter.

In a first step, one of the two rings 17, for example the right ring 171, is positioned against the corresponding hook 11. In a second step, the right bead of the tire is inserted into the rim 3, making sure that the left bead of the tire remains out of the rim. In a third step, the tube is inserted within the tire by slipping it between the left bead and the left side wall of the rim. In a fourth step, the left bead of the tire is inserted into the rim. In a fifth step, the left bead is pressed along an axial direction in order to bring it closer the right bead. By doing this, an interstice is created between the left bead and the hook, into which, in a sixth step, the left ring 172 is slipped. In a seventh step, the tube is inflated, and the unit as assembled is checked for accuracy.

The disassembly is carried out in a similar manner, by reversing the order of the various steps.

Figure 9:
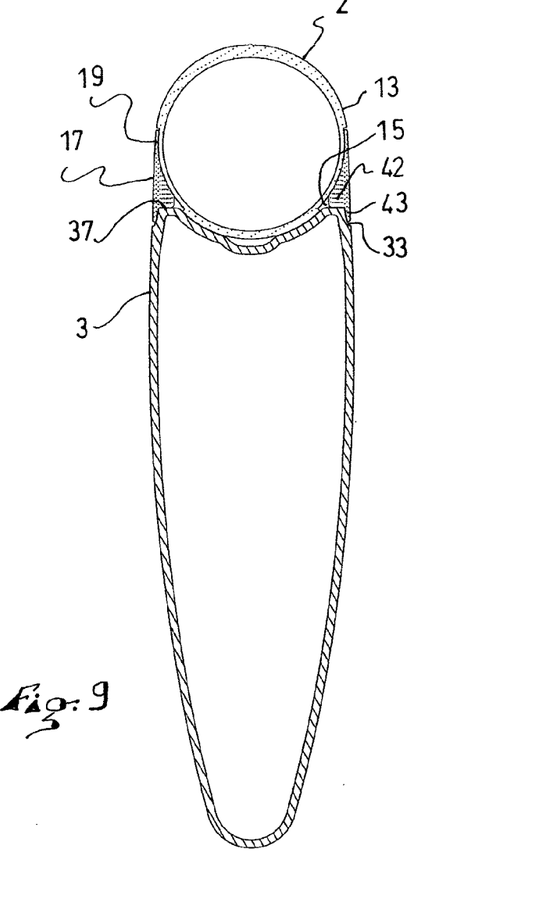
FIG. 9 is a cross section of a wheel according to a fifth embodiment of the invention.

FIG. 9 illustrates a fifth embodiment, in which the interface fitting is comprised of two rings 17 adhered to the interface, between the tire and the rim.

The rim shown in FIG. 9 is structured and arranged to receive a tire of the tubular type. This rim will not be described in further detail hereinafter, because it can be made in any known manner, and in particular in one of the manners previously described for the preceding embodiments. However, the beads 37 of the rim, i.e., the two upper side edges of the rim 3, are each equipped with a circular housing 33.

Each of the rings 17 includes a relatively thick central portion 42, which becomes wedged in the annular groove 15 defined by the tire/rim interface. Above this central portion 42, i.e., radially outward of the wheel, the ring 17 thins down until becoming a fine lip 19 approximately 0.5 mm thick. Beneath this central portion, the ring 17 is extended by a joint 43 whose profile is substantially complementary to the profile of the housing 33.

Because the ring 17 is sufficiently thick, it can be made of an expanded foam having a low density, such as, e.g., a density less than 0.3 g/cm$^3$, for the purpose of weight-saving.

The outer surface of the ring 17 constitutes the outer surface of the wheel, and the most tensioned connection possible, between the side 13 of the tire, in the zone of the greatest width of the tire, and the bead 37 of the rim. By "tensioned connection" is meant that the radius of curvature ρ of the outer surface of the ring is relatively substantial and, in any case, at least greater than the width S of the tire. In this example, the radius of curvature of the outer surface of the ring in the central portion is approximately equal to 1 m. In practice, a radius of curvature greater than 0.3 mm yields good results.

The rings 17 are adhesively secured against the sides of the tire, after the tire has been mounted and adhesively mounted on the rim. Also within the scope of the invention is to have the rings adhesively secured to the rim.

The choice of a foam-type material, which almost entirely fills up the groove 15, makes it possible to produce a very lightweight ring 17. Moreover, the very flexible characteristic of the foam does not prevent the tire from becoming deformed laterally. In fact, because the foam is comprised of a multitude of hollow cells, the characteristics of the ring shown in FIG. 9 are equivalent to those of a ring made of solid materials demarcating a consequent hollow space, such as those illustrated in FIGS. 3 to 8. In a particular embodiment according to the invention, an alveolar foam is selected, one in which at least 40%, or, in another embodiment, at least 50%, of the volume of which are comprised of the empty or hollow spaces of the cells. For example, foams such PVC, PU, or Rohacell®, whose densities range between 0.03 g/cm$^3$ and 0.4 g/cm$^3$ can be used.

Figure 10:
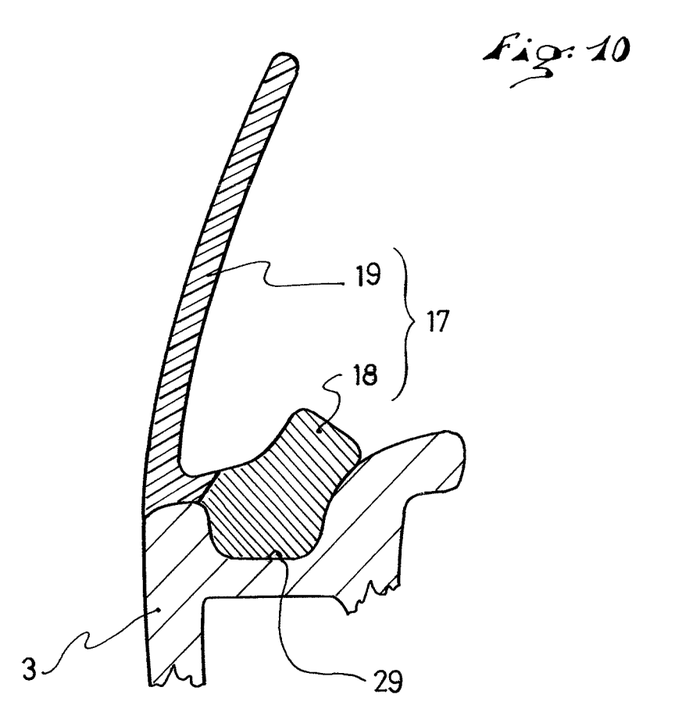
FIG. 10 is a cross section of a ring according to a third embodiment of the invention.

FIG. 10 shows a cross section of a ring 17 according to a sixth embodiment. This figure of drawing partially shows the rim 3 but does not show the tire, so that the shape of the lip 19 does not correspond exactly to the shape that it will assume when the tire is in position and is inflated to the recommended pressure for use.

The base 18 is massive in comparison with the lip 19, which results in bringing the center of gravity of the ring 17 closer to the center of the wheel. Moreover, the lower portion of the base 18 is embedded in a recessed zone 29 arranged on the rim 3. These characteristics contribute to a more stable positioning of the ring 17 on the rim 3.

The base 18 is made of a first material and the lip 19 is made of another material. This bi-material construction of the ring 17 enables an infinite material combination in order to obtain various advantages, various colors, various surface qualities, adhesion of the base 18 and the lip 19, welding or overmolding.

A particularly judicious choice involves co-extruding two materials having different moduli of elasticity. Of course, the two materials must be compatible to allow for the co-extrusion. For example, a more rigid material is selected for the base 18 in order to ensure proper embedding on the rim via a force-friction fit, and a more flexible material is selected for the lip 19 to provide the latter with good elasticity. Such material coupling is constituted by a PEBAX 5533 having a modulus of 150 MPa for the base 18 and a PEBAX 3533 having a modulus of 15 MPa for the lip 19.

The ring 17 of FIG. 10, which is made by co-extrusion of PEBAX 5533 for the base 18 and PEBAX 3533 for the lip, appears particularly stable when it is in position on the rim, even when the lateral deformation of the tire induces an outward opening of the upper portion of the lip 19. Due to the ratio of 10 between the moduli of the two materials, the pre-stressing of the base 18, desirable for its stable embedding in the rim, involves little or no pre-stressing in the area of the upper portion of the lip 19. If it is desired to further reduce the residual pre-stressing in the upper portion of the lip 19, after the ring is mounted on the rim 3, a preliminary rolling of the upper portion as described hereinabove can be performed.

The invention illustratively disclosed herein, suitably may be practiced in the absence of any element which is not specifically disclosed herein.

The invention claimed is:

1. A cycle wheel comprising:
   a tire;
   a rim for rotation about an axis, a cross section of the rim comprising:
      a main portion having a rim width greater than a greatest width of the tire;
      a peripheral portion positioned radially outward of the main portion and which comprises an annular cavity in which the tire is partially received;
   an outer surface of the wheel being comprised of portions of the tire and of the rim facing axially outward of the wheel;
   an interface fitting constituting an intermediate portion of the outer surface of the wheel, the interface fitting comprising a ring, the ring comprising:
      a base in contact with the rim;
      a deformable lip, distinct from the rim, the lip projecting radially outward from the base and in contact with the tire in a zone of the greatest width of the tire;
   the ring having an unmounted diameter, before being assembled to the rim, and a mounted diameter, after being assembled to the ring;
   the mounted diameter of the ring being greater than the unmounted diameter, whereby when the ring is assembled to the rim, the ring is pre-stressed radially in tension against the rim.

2. A wheel according to claim 1, wherein:
   a portion of an outer surface of the tire and an outer surface of the rim form a groove;
   the interface fitting is positioned within said groove;
   the interface fitting has a volume, at least 40% of the volume of the interface fitting is comprised of a hollow space.

3. A wheel according to claim 1, wherein:
   the interface fitting extends substantially between an inner circle C1, centered on the axis A and having a diameter $D_1$, and an outer circle C2, centered on the axis A and having a diameter $D_2$, said diameter $D_2$ being greater than an outer diameter D of the wheel decreased by four-thirds of the tire width S of the tire in an inflated state: $D_2 > D-(4/3) \times S$.

4. A wheel according to claim 1, wherein:
a cross-sectional profile of an outer surface of said interface fitting comprises a curved portion having a radius of curvature, the radius of curvature always greater than the width of the tire in an inflated state.

5. A wheel according to claim 1, wherein:
the interface fitting has a height greater than 25% of a width of the tire in an inflated state.

6. A wheel according to claim 1, wherein:
a hollow space is arranged between the ring and the tire, the ring including the deformable portion of the interface fitting.

7. A wheel according to claim 6, wherein:
along a planar cross section extending through the axis of the rim, said hollow space has an area between 5 mm² and 25 mm².

8. A wheel according to claim 6, wherein:
the interface ring is made of a material having density less than a density of a primary material of the rim.

9. A wheel according to claim 6, wherein:
the interface ring is made of a material having a density less than 1.1 g/cm³.

10. A wheel according to claim 6, wherein:
the interface ring is made of a material having a density less than 1.2 g/cm³.

11. A wheel according to claim 6, wherein:
the interface ring is made of a foam-type material having a density less than 0.4 g/cm³.

12. A wheel according to claim 1, wherein:
the tire comprises beads;
the rim comprises hooks structured and arranged to retain the beads;
the interface fitting includes an edge pinched between one of the beads and the rim.

13. A wheel according to claim 12, wherein:
the interface fitting includes a mating bead inserted between the tire and the rim, the bead of the tire being supported against the mating bead.

14. A wheel according to claim 1, wherein:
the ring is attached to the rim and/or to the tire with adhesive.

15. A wheel according to claim 1, wherein:
the ring includes a base made of a first material and a lip made of a second material.

16. A wheel according to claim 15, wherein:
the lip has an upper end, said upper end having a circumference greater than a circumference of the base of the ring by a value within a range of between 4% and 7%.

17. A wheel according to claim 15, wherein:
the lip has an upper end, said upper end having a circumference greater than a circumference of the base of the ring by a value within a range of between 5% and 6%.

18. A wheel according to claim 1, wherein:
the lip extends substantially radially and has an upper end, said upper end having a circumference greater than a circumference of the base of the ring by a value within a range of between 5% and 6%.

19. A wheel according to claim 1, wherein:
said rim has a body comprising a one-piece extruded profile element having an enclosed hollow casing;
the peripheral portion of the rim body is a portion of the one-piece extruded profile element.

20. A wheel according to claim 1, wherein:
the base of the ring is in contact with the peripheral portion of the rim.

21. A wheel according to claim 1, wherein:
the rim width of the main portion of the rim includes a greatest width of the rim.

22. A cycle wheel comprising:
a tire having a width;
a rim comprising of a body for rotation about an axis, a cross section of said rim body comprising:
   a main portion having a rim width greater than the tire;
   a peripheral portion positioned radially outward of said main portion and which comprises an annular cavity in which said tire is partially received;
   the peripheral portion comprising a radially outward projecting spoiler;
an outer surface of the wheel being comprised of portions of the tire and of the rim facing axially outward of the wheel;
an interface fitting in contact with the tire and the peripheral portion of the rim, said interface fitting constituting an intermediate portion of said outer surface of the wheel;
said interface fitting comprising a component of the wheel distinct from the tire and distinct from the rim, the interface fitting including a deformable portion;
the interface fitting further comprising a ring and a hollow space arranged between the ring and the tire, the ring including the deformable portion of the interface fitting;
the ring being in engagement with the spoiler and being axially biased by the spoiler toward and against the tire.

23. A cycle wheel comprising:
a tire having a width;
a rim for rotation about an axis, a cross section of the rim comprising:
   a main portion having a rim width greater than the tire width;
   a peripheral portion positioned radially outward of the main portion and which comprises an annular cavity in which the tire is partially received;
an outer surface of the wheel being comprised of portions of the tire and of the rim facing axially outward of the wheel;
an interface fitting constituting an intermediate portion of the outer surface of the wheel, the interface fitting comprising a ring, the ring comprising:
   a base in contact with the rim;
   a deformable lip, distinct from the tire and distinct from the rim, the lip projecting radially outward from the base and in contact with the tire;
means for pre-stressing the ring axially to bias the lip against the tire.

24. A wheel according to claim 23, wherein:
the ring has an unmounted diameter, before being assembled to the rim; and a mounted diameter, after being assembled to the ring;
the mounted diameter is greater than the unmounted diameter, whereby when the ring is assembled to the rim, the ring is pre-stressed radially in tension against the rim.

* * * * *